United States Patent
Fujita

(10) Patent No.: US 11,675,405 B2
(45) Date of Patent: Jun. 13, 2023

(54) INFORMATION PROCESSING DEVICE, INFORMATION PROCESSING METHOD, SERVICE SYSTEM, PROGRAM, AND STORAGE MEDIUM

(71) Applicant: HONDA MOTOR CO., LTD., Tokyo (JP)

(72) Inventor: Takahito Fujita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/430,342

(22) PCT Filed: Feb. 20, 2020

(86) PCT No.: PCT/JP2020/006808
§ 371 (c)(1),
(2) Date: Aug. 12, 2021

(87) PCT Pub. No.: WO2020/171170
PCT Pub. Date: Aug. 27, 2020

(65) Prior Publication Data
US 2022/0137689 A1    May 5, 2022

(30) Foreign Application Priority Data
Feb. 20, 2019   (JP) .............................. JP2019-028040

(51) Int. Cl.
*G06F 1/26* (2006.01)
*G06F 1/14* (2006.01)
*H01M 10/48* (2006.01)

(52) U.S. Cl.
CPC ................ *G06F 1/263* (2013.01); *G06F 1/14* (2013.01); *H01M 10/48* (2013.01)

(58) Field of Classification Search
None
See application file for complete search history.

(56) References Cited

FOREIGN PATENT DOCUMENTS

| EP | 0986034 | 3/2000 |
|----|---------|--------|
| EP | 2578997 | 10/2013 |
| JP | 2012-174107 | 9/2012 |
| JP | 2012-228074 | 11/2012 |
| JP | 2014-527689 | 10/2014 |

(Continued)

OTHER PUBLICATIONS

International Search Report and Written Opinion for International Application No. PCT/JP2020/006808 dated Apr. 28, 2020, 7 pages.

(Continued)

*Primary Examiner* — Paul Yen
(74) *Attorney, Agent, or Firm* — Amin, Turocy & Watson, LLP

(57) ABSTRACT

An information processing device includes an acquirer that acquires first date and time information including information relating to a date and time at which a battery detachably installed in a moving body capable of moving by use of electric power is used and second date and time information including position information of a user's portable terminal and information relating to a date and time at which the position information is acquired; and an integrator that generates position history information of the battery on the basis of the first date and time information and the second date and time information acquired by the acquirer.

19 Claims, 8 Drawing Sheets

(56) References Cited

FOREIGN PATENT DOCUMENTS

| | | |
|---|---|---|
| JP | 2017-195722 | 10/2017 |
| JP | 6360935 | 7/2018 |
| WO | 2013/016555 | 1/2013 |
| WO | 2015/125430 | 8/2015 |
| WO | 2018/174214 | 9/2018 |
| WO | 2018/174216 | 9/2018 |

OTHER PUBLICATIONS

Written Opinion for International Application No. PCT/JP2020/006808 dated Apr. 28, 2020, 3 pages.
Extended European Search Report for European Patent Application No. 20759332.8 dated Mar. 14, 2022.

FIG. 3

BATTERY DATA 252

| BATTERY ID: BA001 | | | | | |
|---|---|---|---|---|---|
| USER ID | RETURN ST ID | SOC AT RETURN (kWh) | SYNCHRONOUS ST TIME | BATTERY TIME | MOVING DISTANCE (m) |
| EM001 | STXXX | XX.X | XX:XX | XX:00 | XXXX |
| | | | | XX:30 | XXXX |
| | | | | ⋮ | |
| | | | | XX:50 | XXXX |

FIG. 4

SELF-POSITION DATA 372

| USER ID: EM001 | |
|---|---|
| TERMINAL TIME | SELF-POSITION |
| XX:00 | E: XXX° XX′ XX″<br>N: XX° XX′ XX″ |
| XX:10 | E: XXX° XX′ XX″<br>N: XX° XX′ XX″ |
| ⋮ | |
| XX:50 | E: XXX° XX′ XX″<br>N: XX° XX′ XX″ |

FIG. 5

MOVEMENT HISTORY DATA 472

USER ID: EM003

USER ID: EM002

USER ID: EM001

| BATTERY ID | RETURN STID | SOC AT RETURN (kWh) | TIME | MOVING DISTANCE (m) | SELF-POSITION |
|---|---|---|---|---|---|
| BA001 | STXXX | XX.X | XX:00 | XXXX | E:XXX° XX' XX"<br>N: XX° XX' XX" |
| | | | XX:30 | XXXX | E:XXX° XX' XX"<br>N: XX° XX' XX" |
| | | | ⋮ | | |
| | | | XX:50 | XXXX | E:XXX° XX' XX"<br>N: XX° XX' XX" |
| BA009 | STXXX | XX.X | XX:XX | XXXX | E:XXX° XX' XX"<br>N: XX° XX' XX" |
| | | | XX:XX | XXXX | E:XXX° XX' XX"<br>N: XX° XX' XX" |
| | | | ⋮ | | |
| | | | XX:XX | XXXX | E:XXX° XX' XX"<br>N: XX° XX' XX" |

FIG. 7

USER BEHAVIOR DATA 474

| USER ID | BEHAVIORAL RANGE | FREQUENT USE STID | FREQUENT USE TIME SLOT |
|---|---|---|---|
| EM001 | ○○ ～ ○○ | STXXX STXXX STXXX | XX:XX ～ XX:XX |
| EM002 | ○○ ～ ○○ | STXXX STXXX STXXX | XX:XX ～ XX:XX |
| EM003 | ○○ ～ ○○ | STXXX STXXX STXXX | XX:XX ～ XX:XX |

⋮

INFORMATION PROCESSING DEVICE, INFORMATION PROCESSING METHOD, SERVICE SYSTEM, PROGRAM, AND STORAGE MEDIUM

TECHNICAL FIELD

The present invention relates to an information processing device, an information processing method, a service system, a program, and a storage medium.

Priority is claimed on Japanese Patent Application No. 2019-28040, filed Feb. 20, 2019, the content of which is incorporated herein by reference.

BACKGROUND ART

In a joint use service for renting and recharging detachable batteries, batteries are rented from charging stations set up in a plurality of locations and replaced at said charging stations when power has been consumed. In a conventional technique used for joint use battery services, there is a collection, charging, and distribution device that collects, charges, and distributes a portable electric energy storage device, for example, a detachable battery, when the portable electric energy storage device is mounted in an electric scooter for use, and electric power is consumed (see, for example, Patent Document 1).

In such a joint use battery service using the above collection, charging, and distribution device, the collection, charging, and distribution device is installed at, for example, a charging station, and a user removes a detachable battery that has been charged at the charging station from its housing and attaches it to an electric scooter for use. Conversely, the user detaches a detachable battery that needs to be charged due to consumption of electric power from the electric scooter, houses it in the housing of the collection, charging, and distribution device, and replaces it with a charged detachable battery. Further, there is an information processing device in which a mobile battery is provided with a memory and a movement history of the mobile battery or information indicating the movement history is stored in this memory (see, for example, Patent Document 2).

CITATION LIST

Patent Document

[Patent Document 1]
PCT Japanese Translation Patent Publication No. 2014-527689
[Patent Document 2]
Japanese Patent No. 6360935

SUMMARY OF INVENTION

Technical Problem

In a joint use battery service using the above-described technique disclosed in Patent Document 1, achieving the development of various services by detecting a user's movement history can be considered. Since the detachable battery is provided with, for example, a storage device for storing the SOC or the like of the battery, providing the battery or an electric vehicle with, for example, a position detection device and storing a position detected by the position detection device as the position of the battery in the storage device can be considered. However, since the amount of information collected by the position detection device is often large, there is a problem in that the capacity of the storage device provided for battery has to be increased.

The present invention was achieved in view of such circumstances, and one object thereof is to provide an information processing device, an information processing method, a service system, a program, and a storage medium that make it possible to detect a user's movement history.

Solution to Problem

The following configurations are adopted in an information processing device, an information processing method, a service system, a program, and a storage medium according to this invention.

(1) An information processing device is provided including: an acquirer configured to acquire first date and time information including information relating to a date and time at which a battery detachably installed in a moving body capable of moving by use of electric power is used and second date and time information including position information of a user's portable terminal and information relating to a date and time at which the position information is acquired; and an integrator configured to generate position history information of the battery on the basis of the first date and time information and the second date and time information acquired by the acquirer.

(2) In (1), the integrator generates the position history information of the battery by excluding information whose acquired date and time do not correspond to the date and time indicated in the first date and time information from the second date and time information of the portable terminal.

(3) In (1) or (2), the first date and time information is stored in a storage of the battery, and the acquirer acquires the first date and time information when the battery is kept in a keeping device for keeping the battery.

(4) In any of (1) to (3), the first date and time information includes information clocked by a clock function of the moving body.

(5) In any of (1) to (4), a communicator configured to communicate with the portable terminal is further included, and the acquirer acquires the position information and the second date and time information through the communicator.

(6) In any of (1) to (5), an estimator configured to estimate the user's behavior on the basis of the position history information of the battery is further included.

(7) In (6), the estimator estimates the user's behavior using a machine learning model that uses the position history information as input data.

(8) In (7), the position history information of the battery includes data of at least any one of the date and time based on the first date and time information and the second date and time information, a position of the battery, or a moving distance of the moving body having the battery installed therein.

(9) In (7) or (8), a generator configured to generate the machine learning model is further included.

(10) In any of (6) to (9), the user's behavior includes at least any one of a time slot in which the user frequently uses the battery, the user's behavioral range, or a keeping device that keeps the battery which is frequently used by the user.

(11) In any of (1) to (10), the acquirer further acquires information on a moving distance of the moving body having the battery installed therein.

(12) In (1) to (11), the battery is a battery which is shared by a plurality of users.

(13) In any of (1) to (12), the battery is provided in the moving body by means of a keeping device that keeps the battery.

(14) In (13), the battery is able to be kept by a plurality of the keeping devices.

(15) In (13) or (14), the keeping device acquires identification information of a user of the moving body in which the battery is provided, and the identification information of the user is stored in a storage of the battery provided in the moving body.

(16) In any of (1) to (15), the keeping device includes the charging device that charges the battery being kept.

(17) According to an aspect of this invention, a service system is provided including: the information processing device according to any one of claims 1 to 16; and a keeping device in which a battery is provided in the moving body, wherein the first date and time information is information obtained by counting a cycle clock in the battery, and the keeping device synchronizes a time ascertained by the information processing device with a time stored in the battery when the battery is provided in the moving body.

(18) According to an aspect of this invention, an information processing method is provided including causing a computer of an information processing device to: acquire first date and time information including information relating to a date and time at which a battery detachably installed in a moving body capable of moving by use of electric power is used and second date and time information including position information of a user's portable terminal and information relating to a date and time at which the position information is acquired; and generate position history information of the battery on the basis of the first date and time information and the second date and time information which are acquired.

(19) According to an aspect of this invention, a program is provided causing a computer of an information processing device to: acquire first date and time information including information relating to a date and time at which a battery detachably installed in a moving body capable of moving by use of electric power is used and second date and time information including position information of a user's portable terminal and information relating to a date and time at which the position information is acquired; and generate position history information of the battery on the basis of the first date and time information and the second date and time information which are acquired.

(20) According to an aspect of this invention, a storage medium is provided having the program stored therein.

Advantageous Effects of Invention

According to (1) to (20), it is possible to detect a user's movement history.

BRIEF DESCRIPTION OF DRAWINGS

FIG. 3 is a diagram showing an example of battery data 252.

FIG. 4 is a diagram showing an example of self-position data 372.

FIG. 5 is a diagram showing an example of movement history data 472.

FIG. 7 is a diagram showing an example of user behavior data 474.

DESCRIPTION OF EMBODIMENTS

Figure 1:
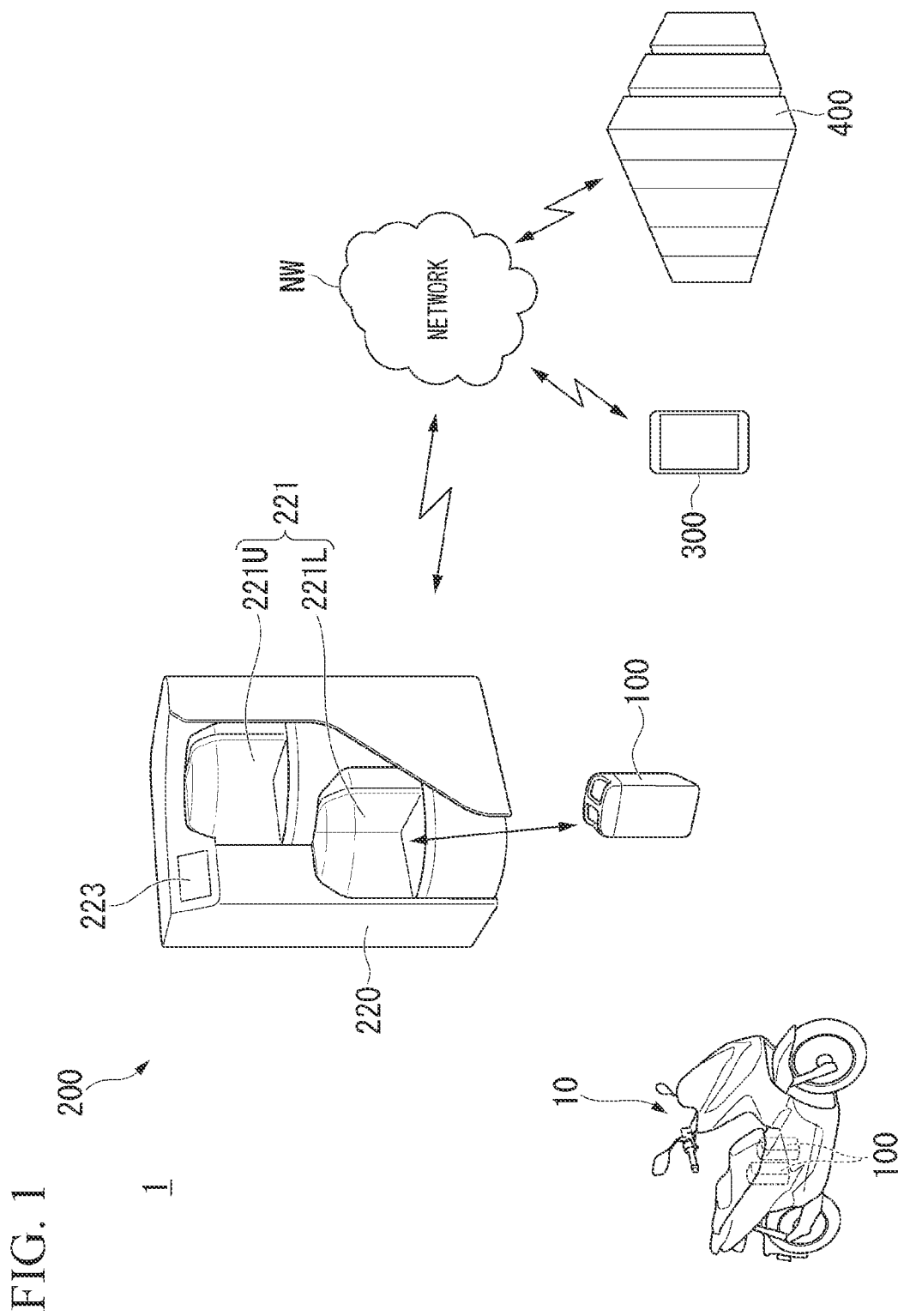
FIG. 1 is an overall configuration diagram of a service system 1 using an information processing device 400 of an embodiment.

Hereinafter, an embodiment of an information processing device, an information processing method, a service system, a program, and a storage medium of the present invention will be described with reference to the accompanying drawings. Every battery unit 100 includes a detachable battery (hereinafter referred to as a "battery") 120 that can be attached to and detached from an electric vehicle 10. The battery unit 100 (the battery 120) is rented to a user at a charging station 200. The charging station 200 charges the battery 120 included in the battery unit 100 before the battery unit 100 is rented to a user.

The charging station 200 rents and provides the battery unit 100 to a user, and the user mounts the battery unit 100 in the electric vehicle 10. When renting the battery, the charging station 200 synchronizes an ST time to be described later which is ascertained by the charging station 200 with a battery time to be described later which is stored in the battery. The user returns the battery unit 100 at any of a plurality of charging stations 200 after the amount of charging of the battery 120 of the rented battery unit 100 is reduced. The charging station 200 rents a battery unit 100 including another charged battery 120 to the user who has returned the battery unit 100. In this way, the user replaces the battery unit 100 (the battery 120) at the charging station 200.

<Overall Configuration of Service System 1>

Figure 2:
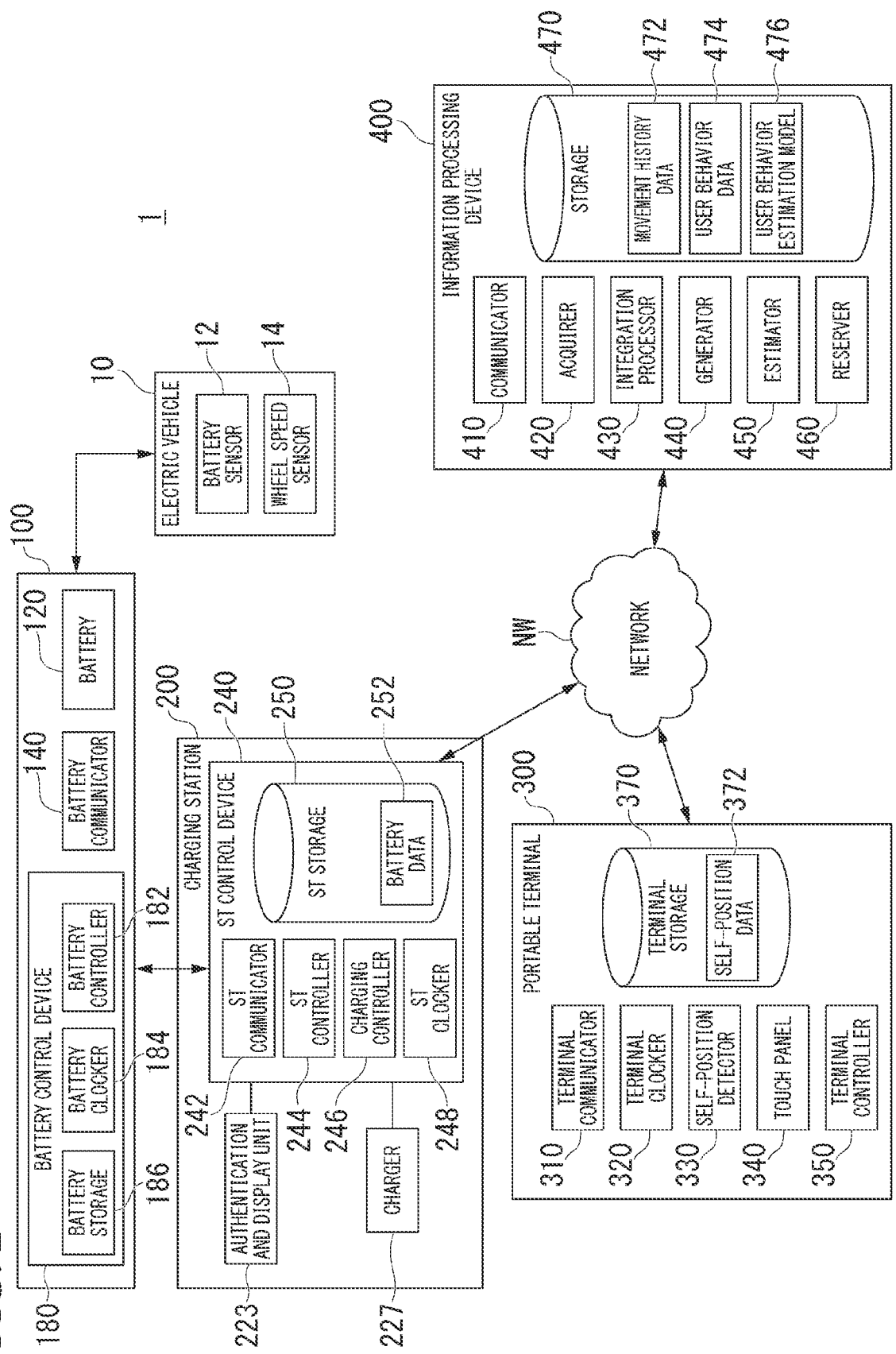
FIG. 2 is a block diagram of the service system 1 using the information processing device 400 of the embodiment.

FIG. 1 is an overall configuration diagram of a service system 1 using an information processing device 400 of an embodiment, and FIG. 2 is a block diagram of the service system 1 using the information processing device 400 of the embodiment. As shown in FIGS. 1 and 2, the service system 1 includes a plurality of battery units 100, a plurality of charging stations 200, a plurality of portable terminals 300, and the information processing device 400. The information processing device 400 is communicably connected to the plurality of charging stations 200 and the plurality of portable terminals 300 through a network NW. The network NW includes, for example, the Internet, a wide area network (WAN), a local area network (LAN), a provider device, a wireless base station, and the like.

The charging station 200 and the portable terminal 300 can transmit and receive communication data to and from the information processing device 400 through the network NW. The service system 1 is a system capable of providing a share service in which the battery 120 in the battery unit 100 which is a driving source of the electric vehicle 10 is shared by a plurality of users. The information processing device 400 manages the plurality of battery units 100, the plurality of charging stations 200, and the plurality of portable terminals 300 in the service system 1. The charging station 200 rents some of the plurality of battery units 100 which are being kept to a user, and accepts the return of the battery unit 100 rented to the user. The battery 120 can be kept by the charging station 200. The electric vehicle 10 is an example of an "electric power device," and the charging station 200 is an example of a "keeping device."

The "electric power device" is not limited to an electric two-wheeled vehicle, and may be, for example, a vehicle that can travel using electric power and in which the battery 120 can be detachably installed (such as a single-wheeled, three-wheeled, or four-wheeled vehicle), an assist-type bicycle, or the like. Instead of these vehicle-type moving bodies, the "electric power device" may be a portable charging and power feeding device carried by a person or a vehicle which is disclosed in Japanese Unexamined Patent Application, First Publication No. 2019-068552. The "electric power device" may be a mobile robot, an autonomous traveling device, an electric bicycle, an autonomous vehicle, another electric vehicle, a drone flight vehicle, or another electric movement device (electric mobility). In the following description, as an example, the "electric power device" is assumed to be an electric two-wheeled vehicle.

<Electric Vehicle 10>

The electric vehicle 10 is a vehicle in which the battery unit 100 is detachably mounted. The electric vehicle 10 is a saddle-type vehicle ("electric two-wheeled vehicle") that travels using an electric motor driven by electric power supplied by the battery 120 in the battery unit 100. The battery unit 100 is mounted in the electric vehicle 10. In the embodiment, two battery units 100 can be mounted in the electric vehicle 10. The number of battery units 100 that can be mounted in the electric vehicle 10 may be one or may be three or more. The battery 120 of the battery unit 100 supplies electric power for movement to the electric vehicle 10.

The electric vehicle 10 may be a hybrid electric vehicle or a fuel cell vehicle that travels by driving using a combination of the battery unit 100 and an internal-combustion engine such as a diesel engine or a gasoline engine. The electric vehicle 10 that can be applied to the service system 1 may be a vehicle such as an electric bicycle, an electric three-wheeled vehicle, an electric four-wheeled vehicle, or a hybrid vehicle, an electric kick skater, a robot, or the like in addition to an electric two-wheeled vehicle. In the embodiment, the electric vehicle 10 is assumed to be an electric two-wheeled vehicle.

As shown in FIG. 2, the electric vehicle 10 includes a battery sensor 12 and a wheel speed sensor 14. The electric vehicle 10 can transmit and receive information to and from the installed battery unit 100 through a communication line or the like which is not shown. The battery sensor 12 includes, for example, various types of sensors such as a current sensor, a voltage sensor, and a temperature sensor that detect the current value, voltage value, temperature, and the like of the battery 120 in the installed battery unit 100. The battery sensor 12 transmits the detection results of various types of sensors to the battery unit 100 using a communication device which is not shown.

The wheel speed sensor 14 is provided on, for example, the wheel of the electric vehicle 10 to detect the rotational speed of the wheel. The wheel speed sensor 14 outputs the detected rotational speed of the wheel to an arithmetic operation device which is not shown, and the arithmetic operation device calculates the vehicle speed of the electric vehicle 10 from the output rotational speed of the wheel. The arithmetic operation device transmits information on the calculated vehicle speed to the battery unit 100 using a communication device which is not shown.

<Battery Unit 100>

As shown in FIG. 1, the battery unit 100 is mounted in the electric vehicle 10 and is kept in a charging device 220 at the charging station 200. The battery unit 100 is a cassette which is detachably installed in the electric vehicle 10. As shown in FIG. 2, the battery unit 100 includes the battery 120, a battery communicator 140, and a battery control device 180.

The battery 120 is a power storage device (secondary battery) such as, for example, a lithium-ion battery. The battery 120 is installed in the electric vehicle 10 to supply electric power for traveling to the electric vehicle 10. The electric power supplied by the battery 120 may be used as electric power other than for traveling.

The battery communicator 140 is an instrument for communicating with the electric vehicle 10 and the charging station 200. By the battery unit 100 being installed in the electric vehicle 10, the battery communicator 140 can transmit and receive information to and from the electric vehicle 10 through a communication line. By the battery 120 of the battery unit 100 being connected to a charger 227 to be described later, the battery communicator 140 can transmit and receive information to and from the charging station 200 through a communication line.

The battery control device 180 includes, for example, a battery controller 182, a battery clocker 184, and a battery storage 186. The battery controller 182 includes, for example, a battery management unit (BMU; controller). The BMU controls charging or discharging of the battery 120. For example, the BMU controls charging of the battery 120 when the battery unit 100 is kept in the charging station 200, and controls charging or discharging of the battery 120 when the battery unit 100 is installed in the electric vehicle 10. The battery storage 186 stores a battery ID. The battery storage 186 is an example of a "storage." The battery ID is, for example, identification information of the battery unit 100 (or the battery 120) consisting of different numbers assigned to each battery unit 100 (or battery 120) in order to individually identify the plurality of battery units 100 (or batteries 120).

The battery controller 182 acquires the detection result transmitted by the battery sensor 12 of the electric vehicle 10 using the battery communicator 140. The battery controller 182 calculates the state of charge (SOC) of the battery 120 on the basis of the acquired detection result. The battery controller 182 stores the calculated SOC of the battery 120 in the battery storage 186. The battery controller 182 acquires information on the vehicle speed of the electric vehicle 10 transmitted by the electric vehicle 10 using the battery communicator 140. The battery controller 182 calculates the moving distance of the electric vehicle 10 by integrating the acquired information on the vehicle speed of the electric vehicle 10. The battery controller 182 stores the calculated moving distance of the electric vehicle 10 in the battery storage 186. The moving distance of the electric vehicle 10 may be calculated by the electric vehicle 10 and transmitted to the battery unit 100.

The battery controller 182 uses the battery communicator 140 to acquire information on the user ID of a user who possesses the electric vehicle 10 which is transmitted by the charging station 200 that rents the battery unit 100. The user ID is, for example, identification information of a user consisting of different numbers assigned to each user in order to individually identify a plurality of users. The battery controller 182 stores the acquired information on the user ID in the battery storage 186.

The battery controller 182 acquires a time provided by the charging station 200 (hereinafter referred to as an "ST time") as a synchronous ST time when the battery 120 is connected to the charger 227. The ST time is a time measured by an ST clocker 248 to be described later at the charging station 200.

The battery controller 182 stores information on the acquired synchronous ST time in the battery storage 186.

The battery clocker 184 counts, for example, the cycle clock of the BMU and detects a relative time in the battery unit 100. The battery clocker 184 calculates a virtual time in the battery unit 100 (hereinafter referred to as a "battery time") on the basis of the detected relative time and the synchronous ST time provided by the charging station 200. The battery clocker 184 outputs information on the calculated battery time to the battery controller 182.

The battery controller 182 calculates the moving distance of the electric vehicle 10 at each predetermined battery time acquisition timing, and stores the calculated moving distance in the battery storage 186 in association with the battery time. The battery time acquisition timing may be set in any way. For example, the battery time acquisition timing may be every minute, every ten minutes, or every hour. The battery time acquisition timing may be set at regular intervals of time, or the intervals of time may be changed in accordance with a time slot. For example, the battery time acquisition timing may be every ten minutes in the daytime, but every hour in the nighttime.

The battery clocker 184 may count the cycle clock of an electronic instrument other than the BMU. The battery clocker 184 may count, for example, the cycle clock of another electronic instrument in the battery unit 100 or an electronic instrument provided in the electric vehicle 10. The battery clocker 184 may acquire the battery time through means other than counting the cycle clock of the electronic instrument.

<Charging Station 200>

The charging station 200 is a facility for keeping and charging the battery unit 100, and is installed at a plurality of places. As shown in FIGS. 1 and 2, the charging station 200 includes the charging device 220 and a charging station control device (hereinafter referred to as an "ST control device") 240. The charging device 220 includes a slot part 221 and an authentication and display 223 shown in FIG. 1 and the charger 227 shown in FIG. 2.

The slot part 221 includes an upper slot part 221U and a lower slot part 221L. Since the upper slot part 221U and the lower slot part 221L have a configuration common to each other, the configuration of the upper slot part 221U will be described as a representative. The upper slot part 221U includes, for example, a turntable that rotates around a vertical axis. Battery housing parts (hereinafter referred to as "housing parts") are provided on the turntable. The housing parts are provided in regions partitioned into four equal parts in a plan view of the turntable.

A takeout port is provided on the surface of the charging device 220. A user can put the battery unit 100 in and take it out of a housing part located at the takeout port from the outside. The housing part located at the takeout port can be replaced by rotating the turntable. The four housing parts are partitioned by a partition plate. The partition plate is formed of, for example, a transparent material.

The authentication and display 223 is an instrument having at least an authentication function and a display function. The authentication and display 223 can read recording information of an NFC card (not shown) carried by a user using, for example, near field communication (NFC). Thereby, the charging station 200 authenticates a user who has a right to use a share service using the user ID included in this recording information. The authentication and display 223 can detect radio waves which are transmitted by a radio wave transmitter possessed by a user. The authentication and display 223 detects a user who has reserved use of the battery unit 100 approaching the charging station 200 on the basis of the detection result of the radio waves transmitted by the radio wave transmitter operated by the user.

The authentication and display 223 includes, for example, a touch panel (a display panel with a touch sensor). Thereby, it is possible to input necessary information in accordance with a user's operation, and to provide various types of visual information to the user. The authentication and display 223 is disposed at the upper left part of the charging device 220. The authentication and display 223 displays various types of information. For example, the authentication and display 223 displays information for notifying of a housing part in which a battery unit to be rented to a user is housed.

The charger 227 shown in FIG. 2 is provided on the inner side of each housing part at the slot part 221 shown in FIG. 1. The charger 227 can be connected to and charged from the battery 120 of the battery unit 100. A power supply for supplying electric power to the battery 120 is connected to the charger 227.

As shown in FIG. 2, the ST control device 240 includes an ST communicator 242, an ST controller 244, a charging controller 246, the ST clocker 248, and an ST storage 250. The ST controller 244 and the charging controller 246 are realized by a processor such as, for example, a central processing unit (CPU) executing a program (software) stored in the ST storage 250. Some or all of these functional units may be realized by hardware (a circuit unit; including circuitry) such as a large scale integration (LSI), an application specific integrated circuit (ASIC), a field-programmable gate array (FPGA), or a graphics processing unit (GPU), or may be realized by software and hardware in cooperation. The program may be stored in a storage device such as a hard disk drive (HDD) or a flash memory (non-transitory storage medium) in advance, may be stored in a detachable storage medium such as a DVD or a CD-ROM (non-transitory storage medium), or may be installed by the storage medium being mounted in a drive device. The ST storage 250 is realized by the above-described storage device. The ST storage 250 stores an STID of the charging station 200 provided with the ST control device 240. The STID is, for example, identification information of the charging station 200 consisting of different numbers assigned to each charging station 200 in order to individually identify the plurality of charging stations 200.

The ST communicator 242 is an instrument for communicating with the electric vehicle 10 and the information processing device 400. By the battery 120 of the battery unit 100 being connected to the charger 227, the ST communicator 242 can transmit and receive information to and from the battery unit 100 through a communication line.

The ST communicator 242 transmits and receives information to and from the information processing device 400 through the network NW. The ST communicator 242 includes, for example, a communication interface such as a wireless module for connecting a cellular network or a Wi-Fi network, or a network card for connection to the network NW.

When the battery 120 of the battery unit 100 is connected to the charger 227, the ST controller 244 reads out information stored in the battery storage 186 of the battery unit 100 through the ST communicator 242 and the battery communicator 140. The information which is read out by the ST controller 244 is, for example, information on the battery ID, the user ID, the current SOC (at return) (hereinafter referred to as the "SOC at return"), the synchronous ST time, the battery time, and the moving distance of the electric vehicle 10 for each battery time. The charging station 200 has the ST controller 244.

The ST controller 244 calculates the amount of charging of the battery 120 on the basis of the information or the like of the SOC read out from the battery unit 100 and outputs information on the calculated amount of charging to the charging controller 246. The ST controller 244 generates and acquires battery data 252 on the basis of various types of information read out from the battery storage 186 of the battery unit 100 and the STID stored in the ST storage 250. The battery data 252 is history information of the battery time which is read out from the battery storage 186. The battery data 252 is information including the date and time when the battery 120 has been used. The battery data 252 is an example of "first date and time information."

FIG. 3 is a diagram showing an example of the battery data 252. As shown in FIG. 3, the battery data 252 includes items of a battery ID, a user ID, a return STID, an SOC at return, a synchronous ST time, a battery time, and a moving distance for each battery time. Among these items, data of items of the battery ID, the user ID, the SOC at return, the synchronous ST time, the battery time, and the moving distance for each battery time is data which is read out from the battery unit 100. The return STID is an STID stored in the ST storage 250. The ST controller 244 stores the generated battery data 252 in the ST storage 250. The ST storage 250 stores the battery data 252 for all the battery units 100 kept in the slot part 221.

The ST controller 244 acquires reservation information transmitted by the information processing device 400 using the ST communicator 242. In a case where the reservation information is output by the information processing device 400, the ST controller 244 prepares for a user who rents the battery unit 100 to perform authentication. For example, in a case where a user corresponding to the reservation information which is output by the ST communicator 242 visits the office, the ST controller 244 performs display control and authentication control of the authentication and display 223. After a reservation user arrives at the charging station 200 and performs authentication through the authentication and display 223, the ST controller 244 causes the authentication and display 223 to display information relating to the battery unit 100 to be rented to the user.

The charging controller 246 charges the battery 120 of the battery unit 100 housed in the housing part of the slot part 221 on the basis of information or the like of the amount of charging which is output by the ST controller 244. The charging controller 246 charges the battery 120 with electric power until the battery 120 is fully charged.

The ST clocker 248 is constituted by, for example, a radio clock, and clocks an absolute time. The time clocked by the ST clocker 248 is set to an ST time. The ST time is generated by the clock function of the battery unit 100 (the battery 120). The ST time may be generated by the clock function of the electric vehicle 10. The ST clocker 248 is only required to be a timepiece or the like that clocks an absolute time, and may be, for example, a timepiece or the like other than a radio clock. When the battery unit 100 is rented to a user, the charging station 200 uses the ST communicator 242 to transmit the ST time to the battery unit 100 as the synchronous ST time and synchronize the synchronous ST time with the battery time.

<Portable Terminal 300>

The portable terminal 300 is, for example, a terminal device such as a smartphone, a tablet terminal, or a notebook personal computer possessed by a user who is provided with a battery, for example, rents the battery. In the portable terminal 300, a user agent (UA) such as an application program or a browser operates to support a share service of the battery 120. The portable terminal 300 can refer to a station map showing the location of the charging station 200. The station map may be held by the information processing device 400, or may be downloaded to the portable terminal 300. The portable terminal 300 can acquire peripheral station information relating to the charging stations 200 around a user by searching the station map using the current position of the user. In the embodiment, it is assumed that the portable terminal 300 is a smartphone and the application program (battery joint use application) is being started up. The portable terminal 300 accepts a user's reservation of the battery unit 100. When the user reserves the rental of the battery unit 100, the rental of the reserved battery unit 100 to non-reservation users other than the reservation user is disabled.

For example, the user can search for a nearby charging station 200 using the portable terminal 300, and in a case where the searched charging station 200 has a rentable the battery unit 100, the user can reserve the battery unit 100. When a plurality of charging stations 200 are searched for, the user can select a charging station 200 to be used.

As shown in FIG. 2, the portable terminal 300 includes a terminal communicator 310, a terminal clocker 320, a self-position detector 330, a touch panel 340, a terminal controller 350, and a terminal storage 370. The terminal communicator 310 transmits and receives information to and from the information processing device 400 through the network NW. The terminal communicator 310 includes, for example, a communication interface such as a wireless module for connecting a cellular network or a Wi-Fi network, or a network card for connection to the network NW.

The terminal clocker 320 is constituted by, for example, a radio clock, and clocks an absolute time. The terminal clocker 320 is only required to be a timepiece or the like that clocks an absolute time, and may be, for example, a timepiece or the like other than a radio clock. The terminal clocker 320 outputs the clocked absolute time (hereinafter referred to as the "terminal time") to the terminal controller 350.

The self-position detector 330 includes, for example, a global navigation satellite system (GNSS) receiver and a self-position detection controller. The GNSS receiver measures its position (the self-position of the battery unit 100) on the basis of radio waves arriving from a GNSS satellite (for example, a GPS satellite). The self-position detection controller includes, for example, a CPU and various types of storage devices, and detects the self-position of the portable terminal 300. The self-position detector 330 generates information of the self-position on the basis of the detected self-position of the portable terminal 300 and outputs the generated information of the self-position as a user's position information to the terminal controller 350 using the receiver. For example, in a case where the user is an occupant (user) who boards the electric vehicle 10, the portable terminal 300 becomes a portable terminal of the occupant of the electric vehicle 10. In this case, the position information of the self-position which is transmitted by the portable terminal becomes position information of the occupant who boards the electric vehicle 10.

The touch panel 340 is a display panel with a touch sensor serving both as a display device that displays various types of information or images and an input device that accepts a user's operation. The touch panel 340 displays, for example, a graphical user interface (GUI) switch, and outputs information according to the operation of the GUI switch to the terminal controller 350. A user can reserve the rental of the battery unit 100 by operating the touch panel 340 of the portable terminal 300.

The terminal controller 350 acquires the self-position of the portable terminal 300 at each predetermined terminal time acquisition timing and stores the acquired self-position in the battery storage 186 in association with the terminal time. The terminal time acquisition timing may be set in any way. For example, the terminal time acquisition timing may be every minute, every ten minutes, or every hour. The terminal time acquisition timing may be set at regular intervals of time, or the intervals of time may be changed in accordance with a time slot. For example, the terminal time acquisition timing is every ten minutes in the daytime, but may be every hour in the nighttime.

The terminal controller 350 generates self-position data 372 on the basis of the acquired terminal time and information of the self-position. FIG. 4 is a diagram showing an example of the self-position data 372. As shown in FIG. 4, the self-position data 372 includes items of a user ID, a terminal time, and a self-position for each terminal time. The self-position data 372 is data in which self-position and a measurement time are associated with each other. The self-position data 372 is information including the date and time when information of a user's self-position is acquired. The self-position data 372 is an example of "second date and time information." The terminal controller 350 transmits the generated self-position data 372 to the information processing device 400 using the terminal communicator 310 when the self-position data 372 is generated or in response to a request from the information processing device 400.

In a case where a user performs a reservation operation of the touch panel 340 for the battery unit 100 when the battery joint use application is being started up, the terminal controller 350 generates desired reservation information according to the user's reservation operation. The terminal controller 350 transmits the generated desired reservation information to the information processing device 400 using the terminal communicator 310. The desired reservation information includes, for example, information on the user ID, the charging station 200 at which the battery unit 100 is desired to be rented, and a desired rental date.

<Information Processing Device 400>

The information processing device 400 functions as a web server or an application server, and acquires information uploaded by the portable terminal 300 while various types of information are provided for the portable terminal 300. The information processing device 400 communicates with the charging station 200 to thereby transmit information indicating that the battery unit 100 has been reserved by a user to the charging station 200 and designate the battery unit 100 to be rented to the user.

The information processing device 400 includes, for example, a communicator 410, an acquirer 420, an integration processor 430, a generator 440, an estimator 450, a reserver 460, and a storage 470. The acquirer 420, the integration processor 430, the generator 440, the estimator 450, and the reserver 460 are realized by a hardware processor such as, for example, a CPU executing a program (software). Some or all of these components may be realized by hardware such as an LSI, an ASIC, an FPGA, or a GPU, or may be realized by software and hardware in cooperation. The program may be stored in a storage device such as an HDD or a flash memory (non-transitory storage medium) in advance, may be stored in a detachable storage medium such as a DVD or a CD-ROM (non-transitory storage medium) or may be installed by the storage medium being installed in a drive device. The storage 470 is realized by the above-described storage device.

The storage 470 stores information such as battery IDs for the plurality of batteries 120 used in the service system 1, and STIDs and locations of the plurality of charging stations 200, and the like. In a case where the battery 120 and the charging station 200 are newly added to the service system 1, the storage 470 additionally stores the battery ID, STID, and the like thereof.

The communicator 410 transmits and receives information to and from the charging station 200, the portable terminal 300, and the like through the network NW. The communicator 410 includes, for example, a communication interface such as a wireless module for connecting a cellular network or a Wi-Fi network, or a network card for connection to the network NW. The communicator 410 receives various types of information transmitted by the charging station 200, the portable terminal 300, and the like.

The acquirer 420 acquires various types of information using the communicator 410. For example, the acquirer 420 acquires the battery data 252 transmitted by the charging station 200 and the self-position data 372 transmitted by the portable terminal 300. The acquirer 420 stores the acquired battery data 252 and self-position data 372 in the storage 470.

The integration processor 430 integrates the battery data 252 and the self-position data 372 which are stored in the storage 470 to generate movement history data 472 and stores the generated data in the storage 470. FIG. 5 is a diagram showing an example of the movement history data 472. As shown in FIG. 5, the movement history data 472 includes items of a user ID, a battery ID, a return STID, an SOC at return, a time, a moving distance, and a self-position. The integration processor 430 generates the movement history data 472 for each user and classifies them with a user ID. The movement history data 472 is an example of "position history information."

The items of the battery ID, the return STID, the SOC at return, and the moving distance are items based on the battery data 252, and the item of the self-position is an item based on the self-position data 372. The item of the time is an item based on both the battery data 252 and the self-position data 372. The integration processor 430 integrates the battery data 252 and the self-position data 372 by matching the time data. The integration processor is an example of an "integrator."

The integration processor 430 integrates the time data stored in the battery data 252 and the self-position data 372. The integration processor 430 excludes data in which the acquired date and time do not correspond to the date and time indicated in the battery data 252 from the self-position data 372 and generates the movement history data 472 of the battery 120. For example, as shown in FIG. 3, the battery data 252 stores the battery time data of "XX:00," "XX:30," and "XX:50.". On the other hand, as shown in FIG. 4, the self-position data 372 stores the terminal time data of "XX:00," "XX:10," and "XX:50." The integration processor 430 generates the movement history data 472 for data common to the battery time of the battery data 252 and the terminal time in the self-position data 372 as shown in FIG. 5. For example, the movement history data 472 includes data of "XX:00," "XX:30" and "XX:50" included in both the battery time in the battery data 252 and the terminal time in the self-position data 372. On the other hand, the movement history data 472 does not include data of "XX:10," "XX:

30," and "XX:50" which are included in the terminal time in the self-position data 372 but not included in the battery time in the battery data 252.

The generator 440 generates a user behavior estimation model 476 for obtaining information relating to a user's behavior as a learning model. The generator 440 generates the user behavior estimation model 476, for example, through machine learning using each item in the movement history data 472 as input data and the user's behavior as output data. The user behavior estimation model 476 is an example of a "machine learning model."

For example, as shown in FIG. 7, the generator 440 generates the user behavior estimation model 476 constituted by a neural network model in which each data of the time, the self-position, the moving distance, and the SOC at return in the movement history data 472 is used as input data, and a behavioral range, a frequent use ST, and a frequent use time slot are used as output.

The generator 440 integrates the output of the user behavior estimation model 476 when the user behavior estimation model 476 is generated. The generator 440 updates and generates the user behavior estimation model 476 by performing statistical processing such as regression analysis or clustering processing on the integrated value of the output of the user behavior estimation model 476. The generator 440 stores the generated user behavior estimation model 476 in the storage 470.

Figure 6:
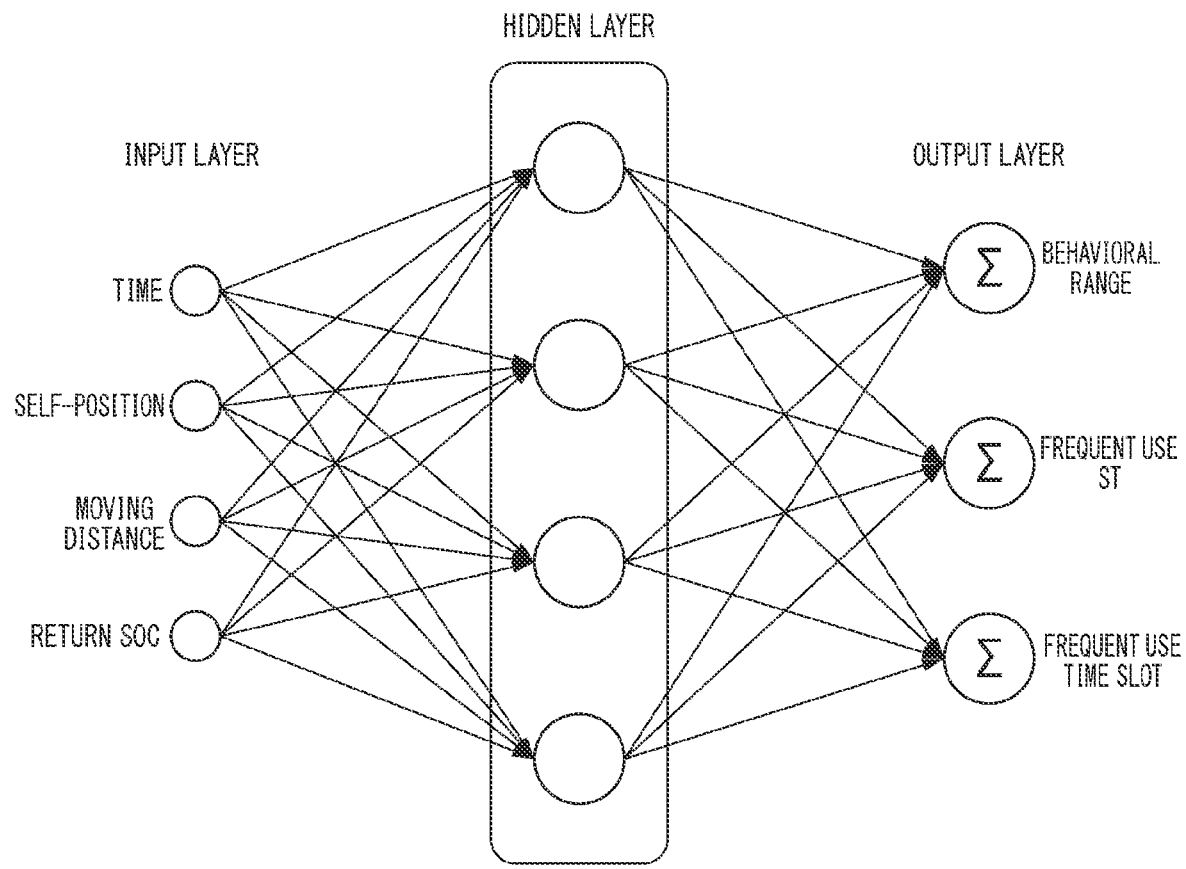
FIG. 6 is a diagram showing an example of a process of generating a user behavior estimation model 476.

FIG. 6 is a conceptual diagram of a process of generating the user behavior estimation model 476. As shown in FIG. 6, the generator 440 generates the user behavior estimation model 476 having an input layer, a hidden layer, and an output layer. Each data of the time, the self-position, the moving distance, and the SOC at return is input to the input layer. The behavioral range, the frequent use ST, and the frequent use time slot are output from the output layer. The hidden layer has a multilayer neural network connecting the input layer and the output layer. The parameters of the hidden layer are optimized by performing machine learning using input to the input layer as learning data and data to be output from the output layer as training data. The generator 440 generates the user behavior estimation model 476 through unsupervised learning, but may generate the user behavior estimation model 476 through supervised learning.

The estimator 450 estimates the user's behavior when a user behavior estimation timing is reached and generates user behavior data 474. The estimator 450 generates the user behavior data 474 on the basis of the user behavior estimation model 476 generated by the generator 440 and the movement history data 472 generated based on the battery data 252 and the self-position data 372. For example, the estimator 450 estimates the user's behavior to generate the user behavior data 474 by inputting information such as time, the self-position, the moving distance, and the SOC at return included in the movement history data 472 to the user behavior estimation model 476 obtained through machine learning.

The user behavior estimation timing may be any timing. For example, the user behavior estimation timing may be set to 8 o'clock, 16 o'clock, and 0 o'clock three times a day, may be set to once a day, or the like. Alternatively, a timing at which there is a request for another device such as the charging station 200 or the portable terminal 300 to estimate the user behavior may be set as the user behavior estimation timing.

FIG. 7 is a diagram showing an example of the user behavior data 474. As shown in FIG. 7, the user behavior data 474 includes items of a user's behavioral range, a frequent use STID, and a frequent use time slot. The user's behavioral range is information indicating a range in which the user behaves to the electric vehicle 10. The user's behavioral range may be estimated in any way, for example, may be estimated as a rectangular range with the maximum value and minimum value of latitude and longitude as vertices or may be estimated as a road through which the electric vehicle 10 can pass within this range. Alternatively, the behavioral range may be estimated as a region connecting ranges of several meters in radius centered on a user's traveling region or as a region surrounded by the region.

The frequent use STID is information indicating the STID of the charging station 200 which is frequently used by a user. Only one frequent use STID may be set or a plurality of frequent use STIDs may be estimated. The frequent use time slot is information indicating a main time slot in which a user uses the electric vehicle 10 having the battery unit 100 mounted therein. In the embodiment, although the items of the behavioral range, the frequent use STID, and the frequent use time slot are estimated for each user, the behavioral ranges of a plurality of user, particularly, all users, the frequent use STID, and the frequent use time slot may be estimated collectively.

In a case where desired reservation information transmitted by the portable terminal 300 is stored in the storage 470, the reserver 460 generates reservation information on the basis of the desired reservation information. The reservation information includes, for example, information such as the user ID of a user who has reserved the battery unit 100, the STID of the reserved charging station 200, and the reservation time.

The reserver 460 generates the user ID included in the desired reservation information as the user ID of the reservation information. The reserver 460 generates information on the STID of the charging station 200 reserved on the basis of the information of the charging station 200 at which the battery unit 100 included in the desired reservation information is desired to be rented. The reserver 460 generates the reservation information on the basis of information of the desired rental date included in the desired reservation information. The reserver 460 transmits the generated reservation information to a rental and charging station using the communicator 410.

Next, an example of processing in the information processing device 400 will be described. The information processing device 400 updates the user behavior estimation model 476 when the battery data 252 transmitted by the charging station 200 is received. The information processing device 400 estimates the user behavior and updates the user behavior data 474 when the user behavior estimation timing is reached. Consequently, first, processing when the information processing device 400 receives the battery data 252 transmitted by the charging station 200 will be described.

Figure 8:
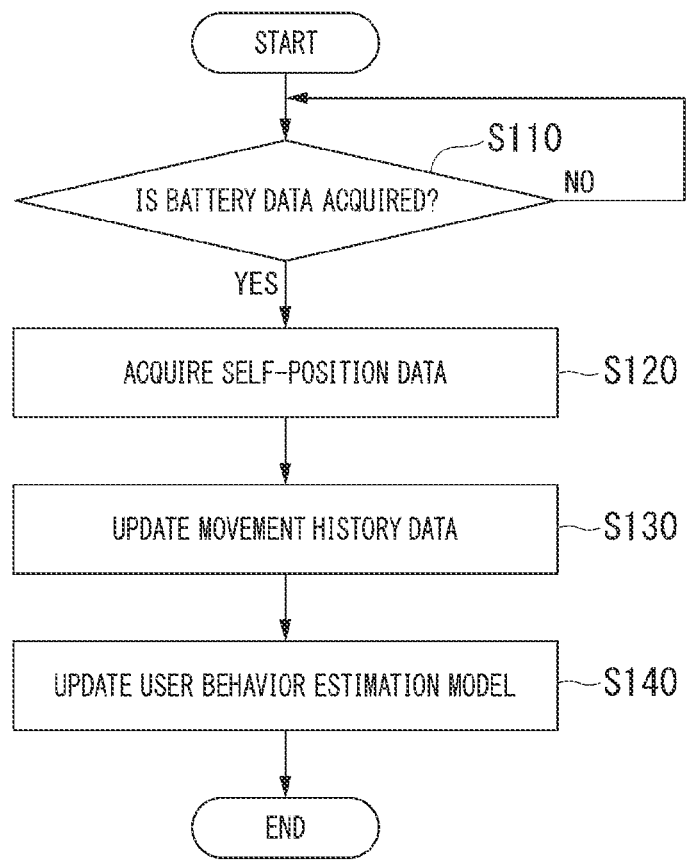
FIG. 8 is a flow chart showing an example of a flow of processes which are executed in the information processing device 400.

FIG. 8 is a flow chart showing an example of a flow of processes which are executed in the information processing device 400. The flow shown in FIG. 8 shows a flow when the battery data 252 transmitted by the charging station 200 is received. The information processing device 400 determines whether the battery data 252 transmitted by the charging station 200 has been received in the communicator 410 (step S110). In a case where it is determined that the battery data 252 has not been received, the information processing device 400 repeats the process of step S110 until the battery data 252 is received.

When it is determined that the battery data 252 has been received, the acquirer 420 acquires corresponding self-position data which is the self-position data 372 including self-position information of the user ID and time (terminal time) corresponding to the user ID and time (battery time) included in the battery data 252 (step S120). When the corresponding self-position data is acquired, the acquirer 420 acquires the corresponding self-position data from a plurality of self-position data 372 stored in the storage 470. In a case where there is no corresponding self-position data in the self-position data 372 stored in the storage 470, the acquirer 420 uses the communicator 410 to request the portable terminal 300 of a user having the user ID included in the battery data 252 to transmit the self-position data 372. The acquirer 420 acquires the self-position data 372 transmitted by the portable terminal 300 requesting the transmission of the self-position data 372 as the corresponding self-position data.

Subsequently, the integration processor 430 adds data obtained by integrating the battery data 252 and the self-position data 372 acquired by the acquirer 420 to the movement history data 472 and updates the movement history data 472 (step S130). Subsequently, the generator 440 performs machine learning using each item of the updated movement history data 472 as input data and updates the user behavior estimation model 476 (step S140). The generator 440 stores the updated user behavior estimation model 476 in the storage 470. In this way, the information processing device 400 ends the processing of the flow chart shown in FIG. 8.

Figure 9:
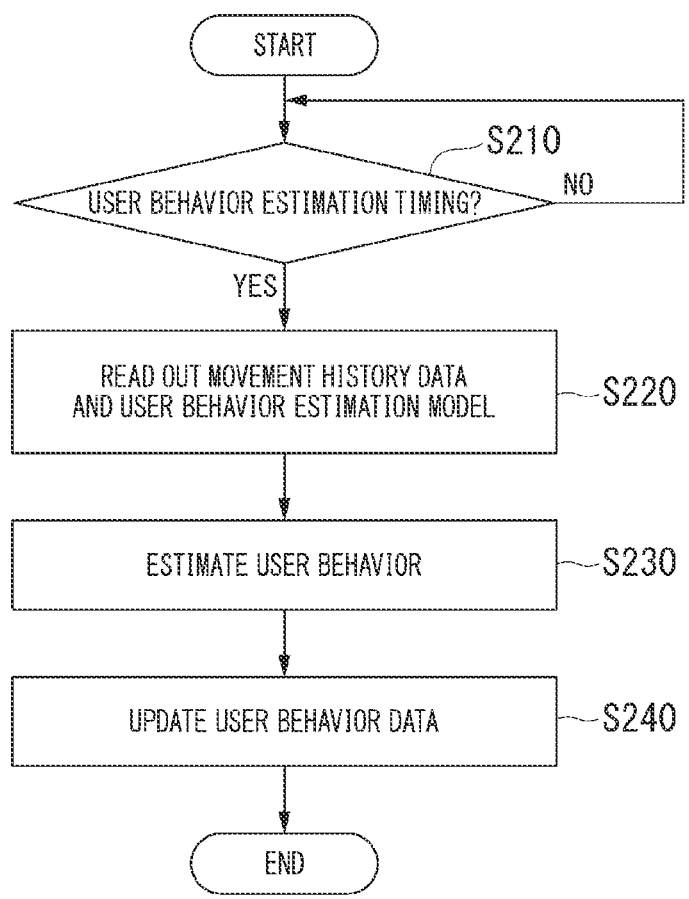
FIG. 9 is a flow chart showing an example of a flow of processes which are executed in the information processing device 400.

Next, processing of the information processing device 400 when the user behavior estimation timing is reached will be described. FIG. 9 is a flow chart showing an example of a flow of processes which are executed in the information processing device 400. The flow shown in FIG. 9 shows a flow when the user behavior estimation timing is reached. The information processing device 400 determines whether the user behavior timing has been reached (step S210). In a case where it is determined that the user behavior estimation timing has not been reached, the information processing device 400 repeats the process of step S210 until the user behavior estimation timing is reached.

In a case where it is determined that the user behavior estimation timing has been reached, the estimator 450 reads out the movement history data 472 and the user behavior estimation model 476 which are stored in the storage 470 (step S220). Subsequently, the estimator 450 estimates the user behavior using the read-out movement history data 472 and user behavior estimation model 476 (step S230). Subsequently, the estimator 450 updates the user behavior data 474 on the basis of the estimated user behavior (step S240), and stores the updated data in the storage 470. In this way, the information processing device 400 ends the processing of the flow chart shown in FIG. 9.

The information processing device 400 of the above embodiment integrates the battery data 252 and the self-position data 372 by matching the battery time of the battery data 252 with the terminal time of the self-position data 372. Therefore, even in a case where the self-position information is not included in the battery data 252, the information processing device 400 can acquire the user's self-position (the self-position of the battery unit 100) by the self-position data 372 being transmitted by the portable terminal 300. Therefore, since the information on the self-position of the battery unit 100 can be acquired without providing the battery unit 100 with an instrument that detects its self-position, it is possible to detect a user's movement history.

In the service system 1 of the above embodiment, the information processing device 400 generates the movement history data 472 using the user ID, the battery time, and the terminal time which are included in the battery data 252 and the self-position data 372. The battery data 252 is generated by the clock function of the battery unit 100. Therefore, the information processing device 400 can accurately detect a user's movement history.

In the above-described embodiment, although the battery time is generated on the basis of the synchronous ST time, information of a relative time which is a count value of the cycle clock of an instrument such as the BMU may be included as information included in the battery data 252 instead of the battery time. In this case, in the charging station 200, information equivalent to the battery time may be generated from the synchronous ST time and the information of a relative time. Alternatively, the charging station 200 may transmit information on the synchronous ST time and the relative time to the information processing device 400, and the information processing device 400 may generate information equivalent to the battery time.

In the above-described embodiment, the user behavior data 474 includes items of the behavioral range, the frequent use STID, and the frequent use time slot, but may include one or two of these items. The user behavior data 474 may include an item of a user's moving distance. The user behavior data 474 may be generated by a rule base based on each data which is input to the input layer of the user behavior estimation model 476 without using the user behavior estimation model 476.

In the above-described embodiment, although the battery unit 100 is reserved or the position information is acquired using the portable terminal 300 on which the battery joint use application operates, the battery unit 100 may be reserved or the position information may be acquired by, for example, a terminal instrument dedicated to a battery joint use service. In this case, the terminal instrument dedicated to a battery joint use service may be, for example, an instrument lent or transferred to a user by an operator of the battery joint use service.

In the above-described embodiment, the battery unit 100 rented to a user is displayed on the authentication and display 223, but may be displayed on another display or the like. For example, each housing part in the slot part 221 may be provided with a light such as a spotlight, and a user may be notified of the battery unit 100 to be rented to the user by turning on or blinking this light.

The housing state of the battery unit 100 may be notified of by means other than a display device or the like. For example, the housing state of the battery unit 100 may be notified of by a voice, or a device in which a change can be felt by touching with a hand or the like may be used. A combination of these means may be used to notify of the housing state of the battery unit 100 through, for example, display using a display device and voice output from a speaker.

In the above-described embodiment, although each of a plurality of housing parts is movable, the plurality of housing parts may be fixed. Although a turntable is used as a structure for moving the housing part, other means, for example, a slider or the like may be used. In this case, a movement mechanism may be, for example, a so-called puzzle-type movement structure.

Although modes for carrying out the present invention have been described above using the embodiments, the present invention is not limited to the embodiments and various modifications and replacements can be applied without departing from the spirit and scope of the present invention.

REFERENCE SIGNS LIST

1 Service system
10 Electric vehicle
100 Battery
120 Battery
140 Battery communicator
180 Battery control device
182 Battery controller
184 Battery clocker
186 Battery storage
200 Charging station
220 Charging device
240 ST control device
242 ST communicator
244 ST controller
246 charging controller
248 ST clocker
250 ST storage
252 Battery data
300 Portable terminal
310 Terminal communicator
320 Terminal clocker
330 Self-position detector
340 Touch panel
350 Terminal controller
370 Terminal storage
372 Self-position data
400 Information processing device
410 Communicator
420 Acquirer
430 Integration processor
440 Generator
450 Estimator
460 Reserver
470 Storage
472 Movement history data
474 User behavior data
476 User behavior estimation model

What is claim is:

1. An information processing device comprising a processor configured to execute a program to:
acquire date and time information including information relating to a date and time at which a detachable battery installed in a moving body capable of moving by use of electric power is used and data including both position information of a portable terminal of a user that boards the moving body and information relating to a date and time at which the position information is acquired; and
generate position history information of the detachable battery on the basis of the date and time information and the data,
wherein
the date and time information is stored in a storage of the detachable battery, and
the processor is configured to execute the program to acquire the date and time information from the detachable battery and to acquire the data from the portable terminal.

2. The information processing device according to claim 1, wherein the processor is configured to execute the program to generate the position history information of the detachable battery by excluding, from among the data of the portable terminal, acquired data whose acquired date and time indicated in the data do not correspond to the date and time indicated in the date and time information.

3. The information processing device according to claim 1, wherein the processor is configured to execute the program to acquire the date and time information when the detachable battery is kept in a keeping device for keeping the detachable battery.

4. The information processing device according to claim 1, wherein the date and time information includes information clocked by a clock function of the moving body.

5. The information processing device according to claim 1, further comprising a communication interface selected from a wireless module and a network card that communicates with the portable terminal,
wherein the processor is configured to execute the program to acquire the data through the communication interface.

6. The information processing device according to claim 1, wherein the processor is configured to execute the program to estimate the user's behavior on the basis of the position history information of the detachable battery.

7. The information processing device according to claim 6, wherein the processor is configured to execute the program to estimate the user's behavior using a machine learning model that uses the position history information of the detachable battery as input data.

8. The information processing device according to claim 7, wherein the position history information of the detachable battery includes supplemental data of at least any one of the date and time based on the date and time information and the data, a position of the detachable battery, or a moving distance of the moving body having the detachable battery installed therein.

9. The information processing device according to claim 7, wherein the processor is configured to execute the program to generate the machine learning model.

10. The information processing device according to claim 6, wherein the user's behavior includes at least any one of a time slot in which the user frequently uses the detachable battery, the user's behavioral range, or a keeping device that keeps the detachable battery which is frequently used by the user.

11. The information processing device according to claim 1, wherein the processor is configured to execute the program to acquire information on a moving distance of the moving body having the detachable battery installed therein.

12. The information processing device according to claim 1, wherein the detachable battery is a battery which is shared by a plurality of users.

13. The information processing device according to claim 1, wherein the detachable battery is provided to the moving body by means of a keeping device that keeps the detachable battery.

14. The information processing device according to claim 13, wherein the detachable battery is able to be kept by a plurality of the keeping devices.

15. The information processing device according to claim 13, wherein the keeping device acquires identification information of a user of the moving body to which the detachable battery is provided, and
the identification information of the user is stored in a storage of the detachable battery provided to the moving body.

16. The information processing device according to claim 1, wherein a keeping device that keeps the detachable battery includes a charging device that charges the detachable battery being kept.

17. A service system comprising:
an information processing device; and a keeping device in which a detachable battery installed in a moving body capable of moving by use of electric power is provided to the moving body, wherein the information processing device comprises a processor configured to execute a program to:

acquire date and time information including information relating to a date and time at which the detachable battery installed in the moving body is used and data including both position information of a portable terminal of a user that boards the moving body and information relating to a date and time at which the position information is acquired; and generate position history information of the detachable battery on the basis of the date and time information and the data, wherein the date and time information is stored in a storage of the detachable battery, the processor is configured to execute the program to acquire the date and time information from the detachable battery and to acquire the data from the portable terminal, and the date and time information is information obtained by counting a cycle clock in the detachable battery, and the keeping device synchronizes a time ascertained by the information processing device with a time stored in the detachable battery when the detachable battery is provided to the moving body.

18. An information processing method comprising causing a computer of an information processing device to:

acquire date and time information including information relating to a date and time at which a detachable battery installed in a moving body capable of moving by use of electric power is used and data including both position information of a portable terminal of a user who boards the moving body and information relating to a date and time at which the position information is acquired; and generate position history information of the detachable battery on the basis of the date and time information and the data, wherein the date and time information is stored in a storage of the detachable battery, and the date and time information is acquired from the detachable battery and the data is acquired from the portable terminal.

19. A computer readable non-transitory storage medium storing a program causing a computer of an information processing device to:

acquire date and time information including information relating to a date and time at which a detachable battery installed in a moving body capable of moving by use of electric power is used and data including both position information of a portable terminal of a user that boards the moving body and information relating to a date and time at which the position information is acquired; and generate position history information of the detachable battery on the basis of the date and time information and the data, wherein the date and time information is stored in a storage of the detachable battery, and the date and time information is acquired from the detachable battery and the data is acquired from the portable terminal.

* * * * *